(12) United States Patent
Zhao et al.

(10) Patent No.: US 6,341,326 B1
(45) Date of Patent: Jan. 22, 2002

(54) METHOD AND APPARATUS FOR DATA CAPTURE USING LATCHES, DELAYS, PARALLELISM, AND SYNCHRONIZATION

(75) Inventors: Cangsang Zhao, Portland, OR (US); Jeffrey K. Greason, Tehachapi, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/221,229

(22) Filed: Dec. 23, 1998

(51) Int. Cl.[7] .............................................. G06F 13/14
(52) U.S. Cl. ........................... 711/104; 710/52; 710/53; 710/57; 710/58; 711/101; 711/150; 711/151; 711/157; 711/167; 711/168
(58) Field of Search ................................. 710/1, 52–61; 711/5, 101, 104, 127, 157, 150, 151, 167, 168

(56) References Cited

U.S. PATENT DOCUMENTS 5,357,613 A * 10/1994 Cantrell et al. ............... 710/61

FOREIGN PATENT DOCUMENTS

| EP | 0119766 | * 9/1984 | ............ G11B/5/09 |
|----|---------|----------|-----------------------|
| WO | 95/15631 | 6/1995 | |
| WO | 99/52213 | 10/1999 | |

* cited by examiner

*Primary Examiner*—Than Nguyen
(74) *Attorney, Agent, or Firm*—Schwegman, Lundberg, Woessner & Kluth, P.A.

(57) ABSTRACT

A static random access memory device used in a system having a data clock includes a recirculating counter producing a pair of clocking signals and n data latches each connected to a source of data chunks. Logic receiving a strobe signal, inverse strobe signal, and the clocking signals, successively latches serial data chunks into n data latches, respectively, such that a data chunk is latched one per each cycle of the data clock and so that every n data chunks form a group of parallel data. A delay circuit delaying certain ones of the data chunks latched into the input data latches long enough to permit all data chunks in a group to be transferred in parallel to further memory circuit, wherein the parallel transfer takes place once every n cycles of the data clock.

19 Claims, 3 Drawing Sheets

METHOD AND APPARATUS FOR DATA CAPTURE USING LATCHES, DELAYS, PARALLELISM, AND SYNCHRONIZATION

TECHNICAL FIELD OF THE INVENTION

The present invention relates generally to data processing, and more particularly to a method and apparatus pertaining to data capture.

BACKGROUND OF THE INVENTION

In a data processing system it is usually necessary to transfer data between system components, and this transfer is often accomplished over a data bus. Data is placed on the bus by a first component, for example a central processing unit (CPU), and received from or captured from the bus by second component, for example a memory device. One such method of data transfer is a source synchronous burst operation bus system. In such a system, there is provided a core clock synchronized to a system clock, and one or more data clocks or strobes synchronized off the core clock, to coordinate data transfers between components. As used in this patent, the term "clock cycle" shall mean a distinct data processing cycle such that, for instance, the clock cycle rate is equal to the data rate.

One method of data capture in a source synchronous burst operation bus system is to use the rising or falling edge of a strobe (referred to herein as "STRB") signal to sample the even number data (for example data0 and data2 . . . ), and use the rising or falling edge of the inverse strobe (referred to herein as "STRB#") signal to sample the odd number data (for example, data1, data3, . . . ), and to synchronize the data (data0, data1, data2, data3, . . . ) one-by-one to the core clock by using an address strobe (ADS)-generated pulse. In this scheme, the serial-to-parallel conversion occurs after synchronization, and each data item is extended for two clock cycles before it is latched on core clock. A clock cycle may thus correspond to one or more periods of the core clock, or it may correspond to a phase or other sub-multiple of a period. In such a method, the setup time margin and hold time margin to latch the data to the core clock is specified as:

Setup time margin=clock cycle−SKEW−STRB distribution skew−clock-to-out

Hold time margin=clock cycle−SKEW−STRB distribution skew+clock-to-out where SKEW is the skew+jitter between the data strobes (STRB/STRB#) and the core clock.

In a system with a core clock cycle of 2.0 to 2.5 ns (400–500 MHZ clock), and with a SKEW of about 0.3–0.5 ns at worst case, fulfilling this setup time margin and hold time margin requirement is still achievable. This further assumes that STRB distribution skew, which varies depending on how close the STRB and STRB# pins of the circuit component are to the input buffers of the component, and how they are routed, can still be kept smaller than 0.5 clock cycle to allow data to be latched by STRB (STRB#). However, if the core clock cycle is raised, for example, to 1.6 Ghz, one clock cycle would be only 0.625 ns. In such a case, the data synchronization scheme described above will not work. Furthermore, with clock cycles as high as this, sending an ADS-generated pulse from the center of a die of a processing component to the I/O areas on one clock cycle can in itself be a challenging task.

SUMMARY OF THE INVENTION

The present invention provides method and apparatus, wherein data is serially latched into a set of latches, delayed and parallelized, and synchronized to a clock for further processing. These and further aspects of the embodiments of the invention are described and claimed below.

DETAILED DESCRIPTION OF THE INVENTION

Figure 1:
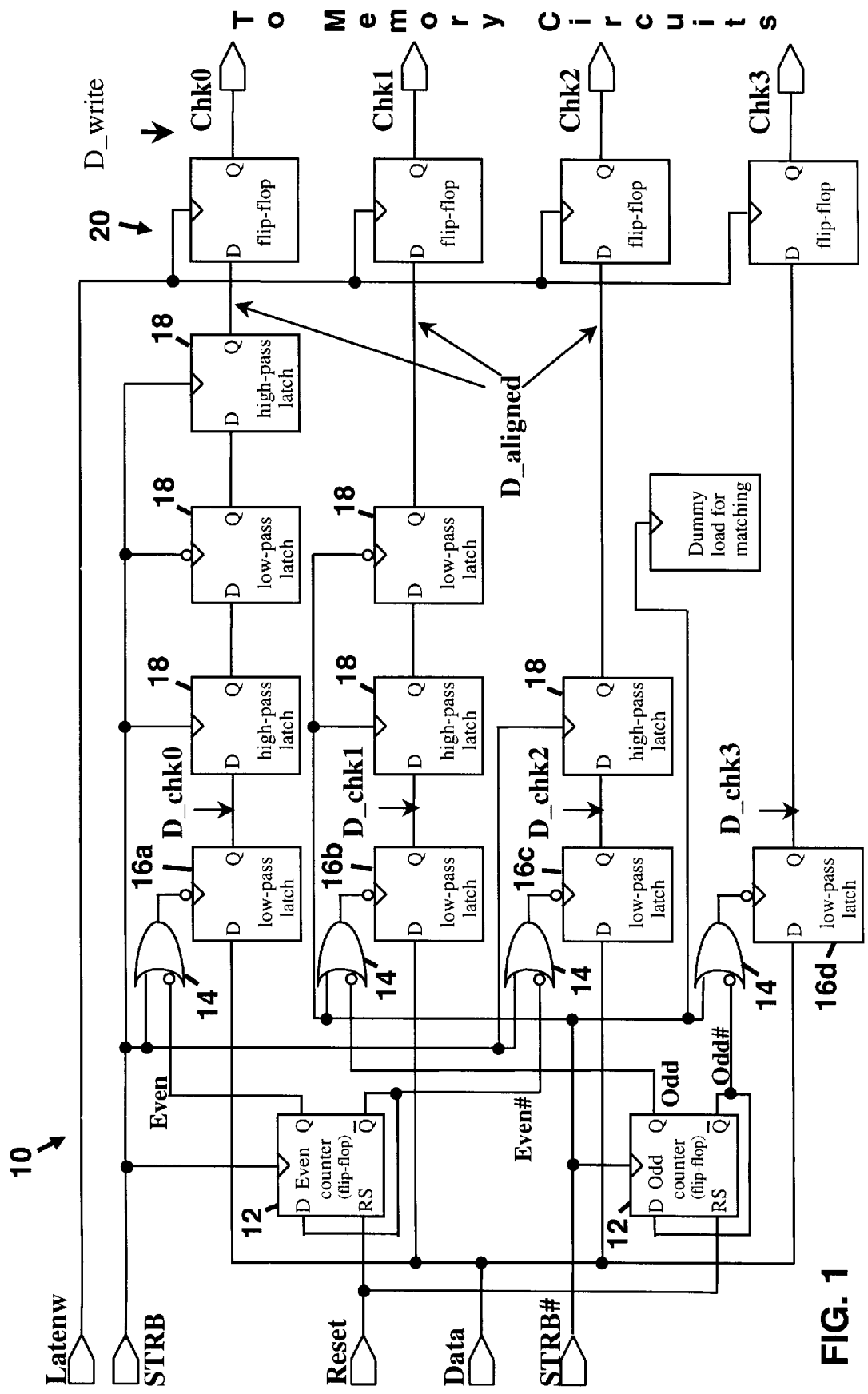
FIG. 1 illustrates a logic diagram for capturing data according to one embodiment of the invention.

In the following detailed description of the invention, reference is made to the accompanying drawings which form a part thereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

Figure 2:
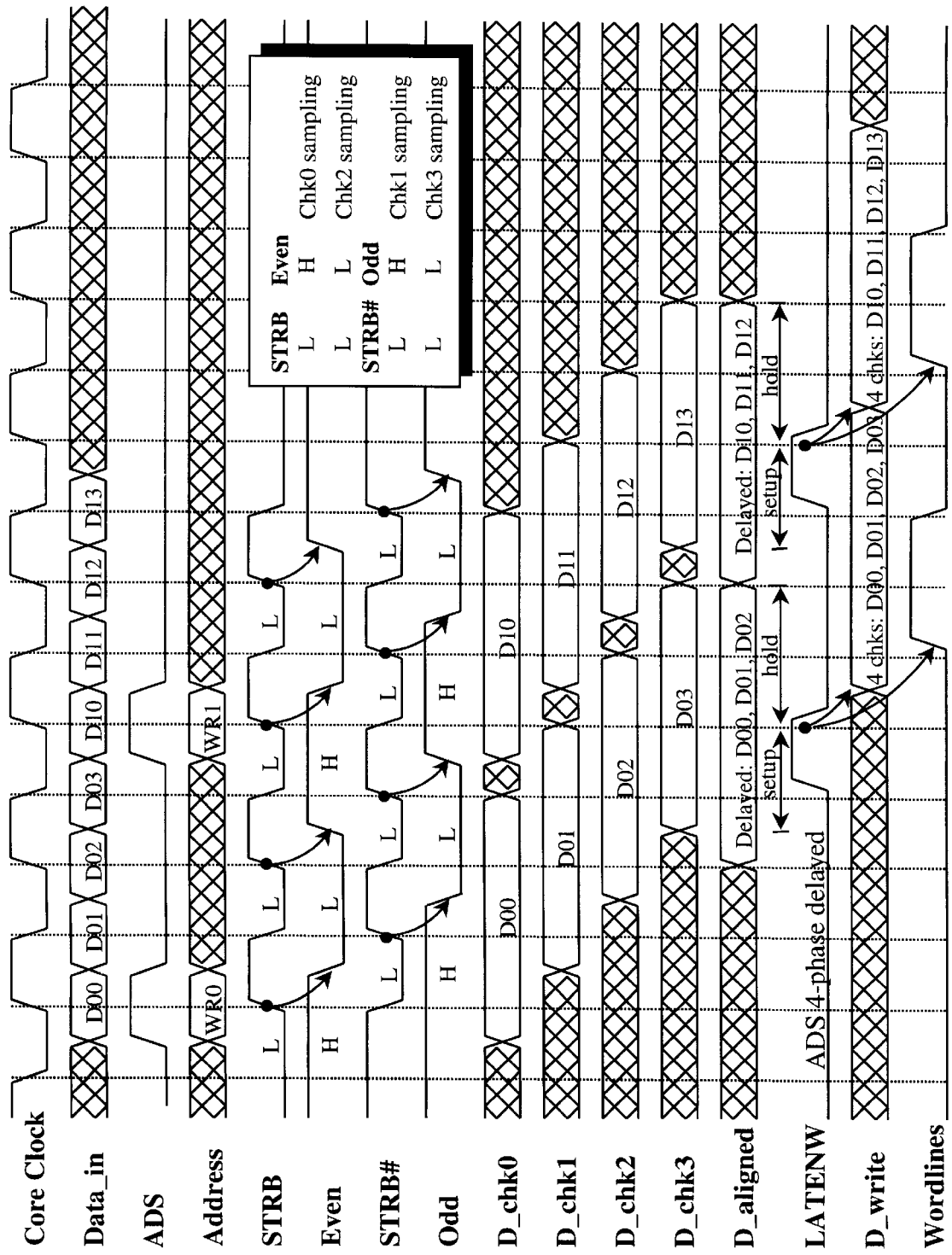
FIG. 2 illustrates a timing diagram corresponding to the operation of the logic diagram of FIG. 1.

Referring to FIG. 1, there is illustrated one embodiment of a circuit 10 for capturing data in a static random access memory (SRAM) semiconductor component, using pipeline burst mode data transfer, according to the present invention. In the example embodiment of FIG. 1, a clock cycle is equal to one phase of the core clock. However, the invention is not so limited and a clock cycle may, for instance, be equal to one or more periods of the core clock, or to less than one phase of the core clock. FIG. 2 illustrates a timing diagram for the circuit of FIG. 1. Circuit 10 performs a serial-to-parallel conversion prior to synchronization with the core clock, allowing the data capture to happen at a lower frequency. In the circuit of FIG. 1, logic 12 receives a Reset signal and the STRB and STRB# signals, and outputs a pair of counter output signals, Even and Odd. The Even and Odd signals, and the data clocks STRB and STRB#, are applied to gates 14, which in turn clock latches 16a–d, to determine which respective incoming serial data chunk, carried on the Data signal line, is to be sampled. As indicated in FIG. 2, data chunks are successively sampled on latches 16a, 16b, 16c and 16d. Once a data chunk is sampled, it is held in a respective one of latches 16a–d, and on the corresponding outputs D_chk0, D_chk1, D_chk2, and D_chk3, for 3.5 cycles. Thus, all four data chunks are then aligned and parallelized. Latches 18 are used to delay D_chk0, D_chk1, D_chk2, to align them with each other and D_chk3, during the respective D_aligned period indicated in FIG. 2. In other words, data0 is delayed three phases, data1 is delayed two phases, and data2 is delayed one phase. Data capture then takes place simultaneously using data capture latches 20, which are clocked with the ADS 4-phase delayed pulse Latenw. Thus, the four captured data chunks can be written to memory circuits in the semiconductor component employing circuit 10, from signals Chk0, Chk1, Chk2 and Chk3 in parallel, during the time indicated by D_write in FIG. 2, using the signal Wordlines to clock the memory circuits, and the Address signals to address such circuits.

Thus, the circuit described above provides that the four chunks of data are parallelized and kept valid simultaneously for 3.5 clock phases. These 3.5-clock-phase wide data make the synchronization of the data to core clock an easier task than trying to synchronize the data on each core clock cycle. In order to minimize access time, the synchronization occurs on the core clock edge, four clock phases after the first data (Data_in) arrives. This clock edge triggers the falling edge of the one clock phase wide pulse Latenw. The falling edge of Latenw then latches the data in latches 20. In this scheme the setup time and hold time to latch the data are as shown in FIG. 2. Thus, to realize a high data rate, the invention provides, in one embodiment, a source synchronous I/O interface, in which a data-capture circuit 10 captures four chunks of input data one-by-one in series while requiring an ADS-delayed pulse Latenw to arrive at the I/O interface within one cycle. For example, with a core clock of 1.54 Gb/s/pin, the ADS-delayed pulse need only be supplied every 2.7 ns.

Figure 3:
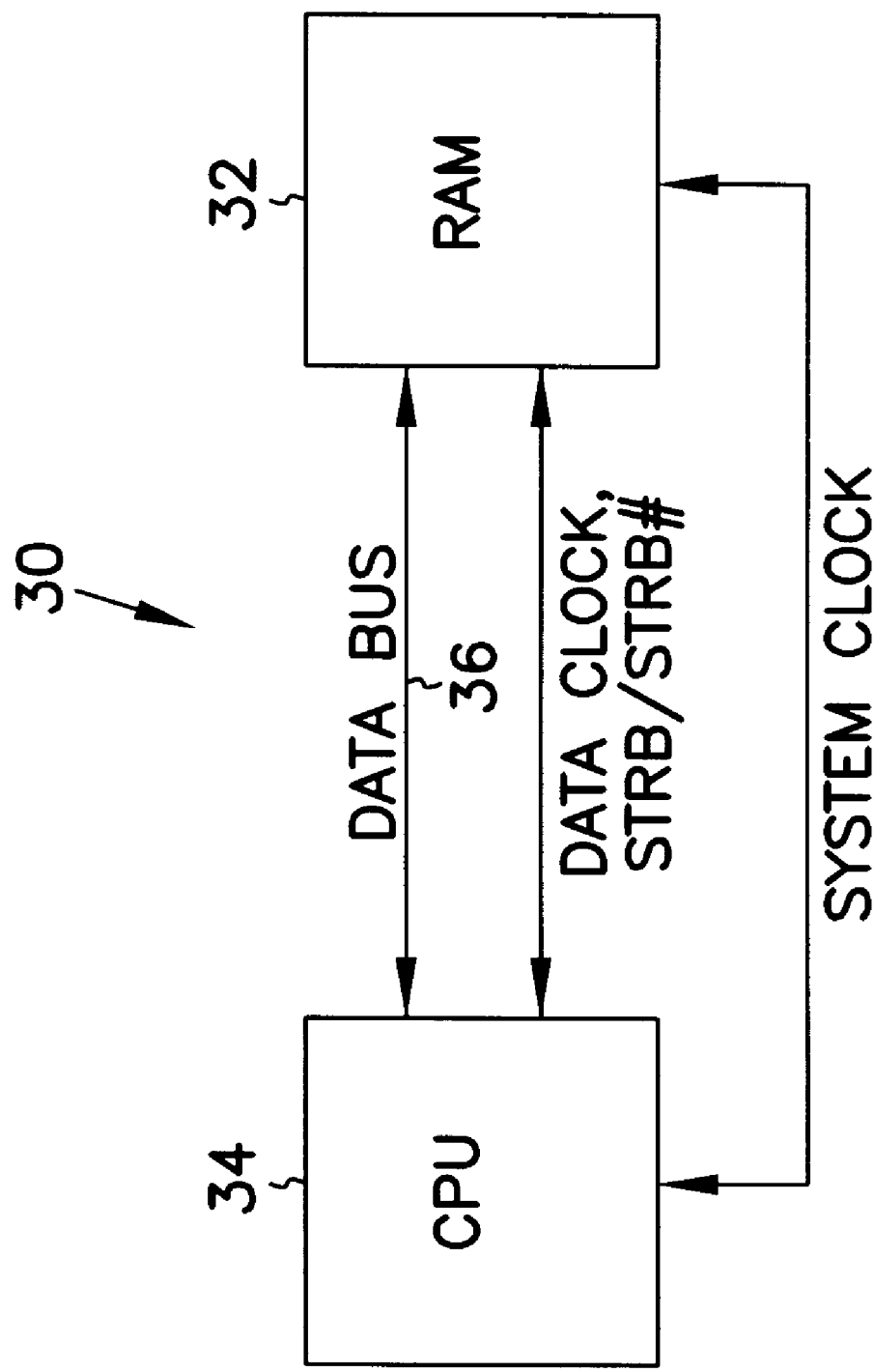
FIG. 3 illustrates a computing system according to one embodiment of the present invention.

Referring now to FIG. 3 there is illustrated a semiconductor memory component 32, incorporating the circuit 10 as described above, in a data processing system 30 including another semiconductor component 34, for example a CPU, wherein device 32 and component 34 are each formed as part of a semiconductor wafer, and are, for example, mounted on a system board. A data bus 36 connects components 32 and 34, which each receive the data clocks STRB and STRB#, and operate using a system or core clock for each component. In this system, data is transferred from component 34 to component 32 in a pipeline burst mode, and captured and synchronized in the component 32 using the circuit 10 described above.

Although the invention has been described above with respect to implementation in an SRAM, for example as may be employed as a high speed data cache, the invention is not so limited, and may be used in other types of memory devices or semiconductor data processing components. Further, it shall be understood that the nomenclature used herein with respect to the various signals described is exemplary only, and shall not be used to limit the scope of equivalent signals in the interpretation of the claims appended hereto. Rather, equivalents to such signals shall be determined solely with respect to the function of such signals in the circuit and systems herein described. Further, as used herein, the term "data chunk" shall refer to one bit of digital data, for a single data input/output pin. In addition, the term core clock shall not be limited to a clock generated "on-board" an integrated circuit, but also to a clock signal supplied to an integrated circuit from an external source.

Thus, the present invention as described above provides a method for data capture and synchronization with a core clock, and example embodiments thereof in a SRAM semiconductor component and a data processing system.

In the claims:

1. A method of data capture in a system having a core clock, comprising:
    using a strobe signal to generate a pair of clocking signals and using the combination of the strobe and clocking signals to control the latching of successive serial data chunks into an n integer number of input data latches, respectively, such that a data chunk is latched one per each cycle of the core clock and so that every n data chunks form a group of parallel data; and
    delaying certain ones of the data chunks latched into the input data latches long enough to permit all data chunks in a group to be transferred in parallel to a further circuit, wherein the parallel transfer takes place once every n cycles of the clock, the first data chunk in each successive group of data chunks arrives at a first latch of the n data latches n clock cycles of the clock after the first data chunk of the preceding group, and the delay is accomplished using two or more groups of delay latches with each group respectively connected to the output of each of two or more of the n data latches, wherein the latches in each group are connected in series and each group has one fewer delay latch than the one associated with a preceding one of the n data latches.

2. A method according to claim 1 further wherein the delayed and parallelized data are captured in a set of n output latches, and held for more than one clock cycle in the output latches.

3. A method according to claim 1 wherein the clock has a period and a clock cycle is equal to one phase of the clock period.

4. A method according to claim 1 wherein the core clock is a system clock.

5. A data capture circuit used in a system having a core clock, comprising:
    an n integer number of input data latches each connected to a source of data chunks, each input data latch receiving a latching signal;
    a clocking circuit receiving a strobe signal and producing a pair of clocking signals;
    logic receiving the strobe signal and the clocking signals, and outputting a latching signal for each input data latch on respective, successive cycles of the core clock; and
    a delay circuit receiving the data chunks latched into the input data latches and outputting all data chunks in a group in parallel to a further circuit;
    wherein the first data chunk in each successive group of data chunks arrives at a first latch of the n data latches n clock cycles of the clock after the first data chunk of the preceding group, the delay circuit comprises two or more groups of delay latches respectively connected to the output of two or more of the n input data latches, and each group has one fewer delay latches than the one associated with a preceding one of the n data latches.

6. Apparatus according to claim 5 further wherein the delayed and parallelized data are captured in a set of n output latches, and held for more than one clock cycle in the output latches.

7. Apparatus according to claim 5 further including static random access memory circuits for storing parallelized data.

8. A memory device according to claim 5 wherein the clock has a period and a clock cycle is equal to one phase of the clock period.

9. Apparatus according to claim 5 wherein the core clock is a system clock.

10. A system having a core clock, comprising:
    a first semiconductor component;
    a bus connecting the first semiconductor component to a second semiconductor component;
    the second semiconductor component comprising a static random access memory device comprising:
        an n integer number of input data latches each connected to a source of data chunks, each input data latch receiving a latching signal;
        a clocking circuit receiving a strobe signal and producing a pair of clocking signals;
        logic receiving the strobe signal and the clocking signals, and outputting a latching signal for each input data latch on respective, successive cycles of the core clock; and a delay circuit receiving the data chunks latched into the input data latches and outputting all data chunks in a group in parallel to a further circuit;

wherein the first data chunk in each successive group of data chunks arrives at a first latch of the n data latches n clock cycles of the clock after the first data chunk of the preceding group, the delay circuit comprises two or more groups of delay latches respectively connected to the output of two or more of the n input data latches, and each group has one fewer delay latches than the one associated with a preceding one of the n data latches.

11. A system according to claim 10 further including a set of n output latches receiving the delayed and parallelized data.

12. A system according to claim 10 further including static random access memory circuits for storing parallelized data.

13. A system according to claim 10 where the clock has a period and a clock cycle is equal to one phase of the clock period.

14. A method of data capture in a system having a core clock, comprising:

latching successive serial data bits into an n integer number of input data latches, respectively, such that a data bit is latched one per each cycle of a core clock and so that every n data bits form a group of parallel data; and delaying certain ones of the data bits latched into the input data latches long enough to permit all data bits in a group to be transferred in parallel to a further circuit, wherein the parallel transfer takes place once every n cycles of the core clock;

wherein the delay is accomplished using delay latches connected in groups to the output of at least one of the n data latches, wherein the latches in each group are connected in series and each group has one fewer delay latch than the one associated with a preceding one of the n data latches.

15. A method according to claim 14 wherein the delayed and parallelized data are captured in a set of n output latches, and held for more than one cycle of the core clock in the output latches.

16. A data capture circuit for use in a system having a core clock, comprising:

an n integer number of input data latches each connected to a source of data bits, each input data latch receiving a latching signal;

logic to output a latching signal for each input data latch on respective, successive cycles of the core clock; and a delay circuit to receive the data bits latched into the input data latches and output all data bits in a group in parallel to a further circuit, wherein the delay circuit comprises delay latches connected in groups to the output of at least one of the n input data latches, wherein the latches in each group are connected in series and each group has one fewer delay latches than the one associated with a preceding one of the n data latches.

17. The data capture of claim 16 further including static random access memory circuits for storing parallelized data.

18. A system having a core clock, comprising:

a first semiconductor component;

a second semiconductor component; and a bus connecting the first semiconductor component to the second semiconductor component, the second semiconductor component including a static random access memory device comprising:

an n integer number of input data latches each connected to a source of data bits, each input data latch receiving a latching signal;

a clocking circuit to receive a strobe signal and produce a pair of clocking signals;

logic responsive to the strobe signal and the clocking signals, to output a latching signal for each input data latch on respective, successive cycles of the core clock; and a delay circuit receiving the data bits latched into the input data latches and outputting all data bits in a group in parallel to a further circuit, wherein the delay circuit comprises two or more groups of delay latches respectively connected to the output of two or more of the n input data latches, wherein each group has one fewer delay latches than the one associated with a preceding one of the n data latches.

19. A system according to claim 18 wherein the second semiconductor component further comprises a set of n output latches receiving the delayed and parallelized data.

* * * * *